(12) United States Patent
Barsness et al.

(10) Patent No.: US 10,031,946 B2
(45) Date of Patent: Jul. 24, 2018

(54) LIMITING TUPLE CREATION AT THE TUPLE LEVEL

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 14/734,552

(22) Filed: Jun. 9, 2015

(65) Prior Publication Data

US 2016/0299953 A1 Oct. 13, 2016

Related U.S. Application Data

(63) Continuation of application No. 14/684,575, filed on Apr. 13, 2015.

(51) Int. Cl.
*G06F 17/30* (2006.01)
*G06F 17/00* (2006.01)
*H04L 29/06* (2006.01)

(52) U.S. Cl.
CPC .... *G06F 17/30516* (2013.01); *G06F 17/3056* (2013.01); *G06F 17/30292* (2013.01);
(Continued)

(58) Field of Classification Search
CPC ........... G06F 17/30516; G06F 9/45558; G06F 2009/4557; G06F 17/30958; G06F 11/3409; G06F 9/50; G06F 11/362; G06F 2009/45562; G06F 11/3404; G06F 17/30592; G06F 9/455; G06F 11/3442; G06F 11/3632; G06F 17/30442; G06F 2201/81; G06F 2201/815; G06F 2201/865; G06F 9/45533; G06F 9/5027; G06F 11/3006; G06F 11/3072; G06F 11/3495;
(Continued)

(56) References Cited

U.S. PATENT DOCUMENTS 7,613,848 B2 11/2009 Amini et al.
7,644,110 B2 1/2010 Nishizawa et al.
(Continued)

OTHER PUBLICATIONS

Ballard et al., "IBM InfoSphere Streams Harnessing Data in Motion," Sep. 2010, 360 pages, IBM Redbooks http://www.redbooks.ibm.com/abstracts/sg247865.html.
(Continued)

*Primary Examiner* — Yicun Wu
(74) *Attorney, Agent, or Firm* — Robert J. Shatto

(57) ABSTRACT

An administrator may wish to limit the number of tuples that may be spawned as a result of a first tuple entering an operator graph. A first stream operator may receive a first tuple in order to perform an operation on the first tuple to generate a second tuple. The first stream operator may determine whether it is permitted to generate the second tuple by comparing the first tuple's tuple spawn counts to a tuple creation policy. If the first stream operator is permitted to generate the second tuple, the first stream operator may perform the operation on the first tuple and generate the second tuple.

18 Claims, 9 Drawing Sheets

(52) U.S. Cl.
CPC .. *G06F 17/30377* (2013.01); *G06F 17/30442* (2013.01); *H04L 65/4069* (2013.01)

(58) Field of Classification Search
CPC .......... G06F 11/3636; G06F 17/30433; G06F 17/30557; G06F 17/30867; G06F 21/6245; G06F 9/466; G06F 9/4881; G06F 9/54; G06F 11/1402; G06F 11/32; G06F 11/364
See application file for complete search history.

(56) References Cited

U.S. PATENT DOCUMENTS

| | | | |
|---|---|---|---|
| 7,945,540 B2 | 5/2011 | Park et al. | |
| 8,095,690 B2* | 1/2012 | Kashiyama | G06Q 10/06 705/1.1 |
| 8,180,914 B2* | 5/2012 | Klein | G06F 17/30516 709/231 |
| 8,560,526 B2 | 10/2013 | Santosuosso et al. | |
| 8,909,671 B2 | 12/2014 | Pallares Lopez et al. | |
| 2009/0319687 A1* | 12/2009 | Goldstein | G06F 9/5083 709/241 |
| 2012/0218268 A1 | 8/2012 | Accola et al. | |
| 2013/0031556 A1 | 1/2013 | Branson et al. | |
| 2014/0156707 A1* | 6/2014 | Sax | G06F 17/30958 707/798 |
| 2015/0248461 A1* | 9/2015 | Theeten | G06F 17/30516 707/718 |

OTHER PUBLICATIONS

Fang et al., "Efficient Skyline Maintenance for Streaming Data with Partially-Ordered Domains," DASFAA 2010, Part I, LNCS 5981, pp. 322-336, 2010, Copyright Springer-Verlag Berlin Heidelberg 2010.

Tatbul et al., "Window-aware Load Shedding for Aggregation Queries over Data Streams," VLDB '06, Sep. 12-15, 2006, 12 pages, Seoul, Korea, Copyright 2006 VLDB Endowment, ACM 1595933859/06/09.

Tu et al., "Control-Based Quality Adaptation in Data Stream Management Systems," DEXA 2005, LNCS 3588, 2005, pp. 746-755, Copyright Springer-Verlag Berlin Heidelberg 2005.

Barsness et al., "Limiting Tuple Creation at the Tuple Level," U.S. Appl. No. 14/684,575, filed Apr. 13, 2015.

IBM, "List of IBM Patents or Patent Applications Treated as Related.".

* cited by examiner

FIG. 7

| TUPLE ID | NO. OF SPAWNS | SPAWN IDS | SPAWN LOCATION | |
|---|---|---|---|---|
| T1 | 6 | T2 | OP61 | 704A |
| | | T3 | OP61 | 704B |
| | | T4 | OP62 | 704C |
| | | T5 | OP62 | 704D |
| | | T6 | OP64 | 704E |
| | | T7 | OP64 | 704F |

FIG. 8

| TUPLE ID | NO. OF SPAWNS | SPAWN IDS | SPAWN LOCATION | |
|---|---|---|---|---|
| T1 | 2 | T2 | OP61 | 804A |
| | | T3 | OP61 | 804B |
| T2 | 2 | T4 | OP62 | 804C |
| | | T5 | OP62 | 804D |
| T3 | 2 | T6 | OP64 | 804E |
| | | T7 | OP64 | 804F |

| TUPLE ID | NO. OF SPAWNS | SPAWN IDS | SPAWN LOCATION |
|---|---|---|---|
| T1 | 6 | T2 | OP61 |
| | | T3 | OP61 |
| | | T4 | OP62 |
| | | T5 | OP62 |
| | | T6 | OP64 |
| | | T7 | OP64 |
| T2 | 2 | T4 | OP62 |
| | | T5 | OP62 |
| T3 | 2 | T6 | OP64 |
| | | T7 | OP64 |

FIG. 9

LIMITING TUPLE CREATION AT THE TUPLE LEVEL

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure include a method for limiting the creation of spawn tuples at the tuple level. A first tuple may enter an operator graph and be assigned a tuple ID. A tuple creation policy, containing one or more thresholds defining the maximum number of associated spawn tuples that may be generated for the first tuple, may be established. A first stream operator may receive the first tuple in order to perform an operation on the first tuple to generate a second tuple. The first stream operator may determine whether it is permitted to generate the second tuple by comparing the first tuple's tuple spawn counts to its tuple creation policy. If the first stream operator is permitted to generate the second tuple, the first stream operator may perform the operation on the first tuple and generate the second tuple. Additional embodiments of the present disclosure are directed to a system and a computer program product for limiting the creation of spawn tuples at the tuple level.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 7 illustrates an example table depicting tuple spawn counts for the operator graph of FIG. 6 that may be monitored to limit tuple creation at the tuple level, in accordance with embodiments of the present disclosure.

FIG. 8 illustrates an alternative example table depicting tuple spawn counts for the operator graph of FIG. 6 that may be monitored to limit tuple creation at the tuple level, in accordance with embodiments of the present disclosure.

FIG. 9 illustrates yet another alternative example table depicting tuple spawn counts for the operator graph of FIG. 6 that may be monitored to limit tuple creation at the tuple level, in accordance with embodiments of the present disclosure.

DETAILED DESCRIPTION

Figure 1:
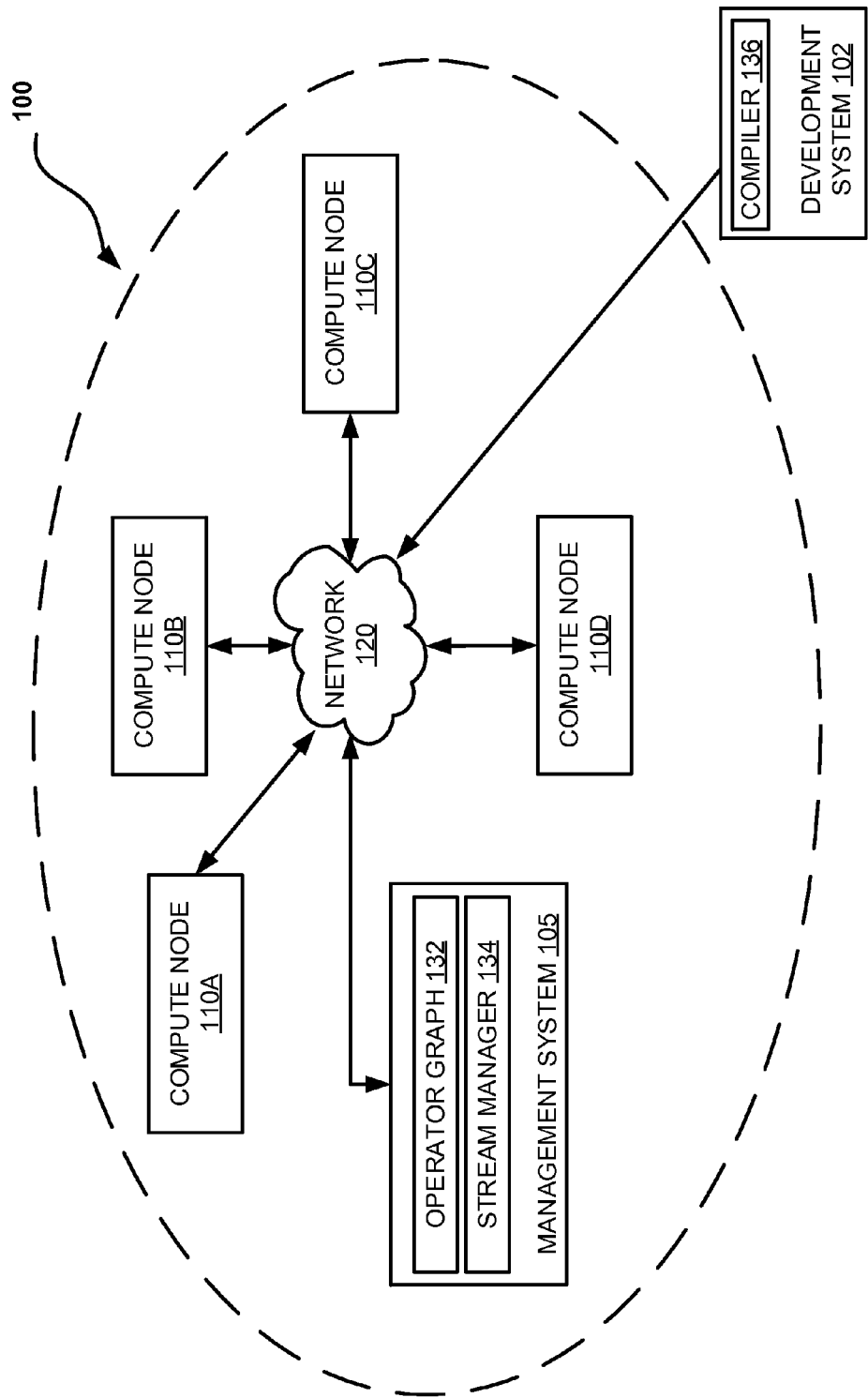
FIG. 1 illustrates a computing infrastructure configured to execute a stream computing application, according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). In embodiments, this is referred to as a "dynamic connection" because both jobs are currently executing when they begin to share the data stream.

A first stream operator may be configured to receive a first tuple, perform an operation on the first tuple, and output a second tuple. The second tuple may be considered a "spawn" of the first tuple, and the first tuple may be considered a "progenitor" of the second tuple. A tuple may have multiple generations of spawns and/or progenitors. For example, the second tuple may be specifically referred to as a "first-generation" spawn of the first tuple because it was generated as a result of a stream operator performing operations directly on the first tuple. If a second stream operator received the second tuple, performed an operation on the second tuple, and output a third tuple, the third tuple would be a spawn of both the first and the second tuples. More specifically, the third tuple would be a first-generation spawn of the second tuple, and a "second-generation" spawn of the first tuple. If the first stream operator passes the first tuple on to the second stream operator, instead of passing on spawns, and the second stream operator created one or more tuples from the first tuple, the one or more tuples would be still be considered first-generation spawns of the first tuple. As an operator graph grows in complexity, additional generations of spawn and progenitor tuples may be present.

A "tuple assignment policy" may establish rules for when a progenitor tuple is charged with the creation of its spawn tuple(s). The tuple assignment policy may also establish which progenitor tuples can be charged with the creation of spawns. For example, a tuple assignment policy may dictate that all first-generation spawn tuples of a progenitor tuple are to be charged to the progenitor tuple. As another example, a tuple assignment policy may indicate that only progenitor tuples generated in a source operator may be charged with the creation of spawn tuples. A tuple assignment policy may apply to an operator graph, a group of operators or processing elements, or to individual operators or processing elements. A single operator graph may consist of multiple tuple assignment policies, with each tuple assignment policy applying to at least one stream operator within the operator graph.

In embodiments, if a spawn tuple is charged to a first tuple in accordance with a tuple assignment policy, the spawn tuple is considered to be an "associated spawn" of the first tuple, also referred to as an "associated spawn tuple." "Tuple spawn counts" may be created to track each progenitor tuple and its associated spawn tuples. Tuple spawn counts may store information related to the creation of spawn tuples. The information may include anything that is needed by a stream operator to determine whether it can, in accordance with a tuple creation policy, generate one or more associated spawn tuples. For example, tuple spawn counts may include, for each progenitor tuple, the number of associated spawn tuples, a list of the associated spawn tuple's tuple IDs, and an identifier that indicates which stream operator generated each of the associated spawn tuples.

In some embodiments, tuple spawn counts may be stored by individual operators or processing elements in a private memory space. In other embodiments, tuple spawn counts may be stored in a shared memory space that may be accessible to a group of operators or processing elements. In some embodiments, tuple spawn counts may be stored in both private and shared memory spaces. The tuple spawn counts may be stored using any type of data structure that is required by the stream computing application, by the stream operators, or by an administrator.

A processing element or stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of a single tuple. As an example, an aggregate stream operator supports windowing by default. However, a stream operator may not necessarily support windowing by default. A stream operator may, however, be configured to support windowing.

A window may be a tumbling or sliding window. A tumbling window may be specified by an eviction policy. When the eviction policy for a tumbling window is met, the stream operator executes operator logic on the tuples currently in the window and then empties the window. With respect to a tumbling window, the "conclusion" of a windowing condition, in this description and the claims, may refer to when the eviction policy for a tumbling window is met. The eviction policy of a tumbling window may be based on a count of tuples, a time interval, a delta, or punctuation. A delta is a difference between an attribute of an oldest tuple and a newest tuple. For example, a windowing condition may compare timestamps. Processing and eviction may be triggered when a time difference exceeds a specified value. A punctuation is a control signal that appears interleaved with the tuples in a stream. Punctuation appears in the data flow and may, for example, notify a stream operator of the grouping of tuples to be processed.

In contrast to a tumbling window, a sliding window does not automatically flush the window when the window is full. Once a window is full, a sliding window expels the oldest tuple when a new tuple arrives to replace it. In this way, a sliding window maintains the size of the window. A sliding window may be specified by an eviction policy and a trigger policy. The eviction policy of a sliding window may be based on a count of tuples, a time interval, or an attribute delta. The trigger policy specifies when the stream operator executes operator logic on the tuples currently in the window. The trigger policy may be based on a count of tuples, a time interval, or an attribute delta. The eviction and trigger policies are independent of one another. With respect to a sliding window, the "conclusion" of a windowing condition, as used in this description and the claims, may refer to when the trigger condition of a sliding window is met.

The phrase "windowing conditions," as used in this description and the claims, may include the conditions used to describe eviction and trigger policies. A stream operator that includes a windowing condition may be referred to, in this description and the claims, as a windowing operator. Windowing may be specified in any number of ways. For example, an application programmer may define one or more specific windowing conditions. Additionally, the system may provide a set of windowing conditions.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
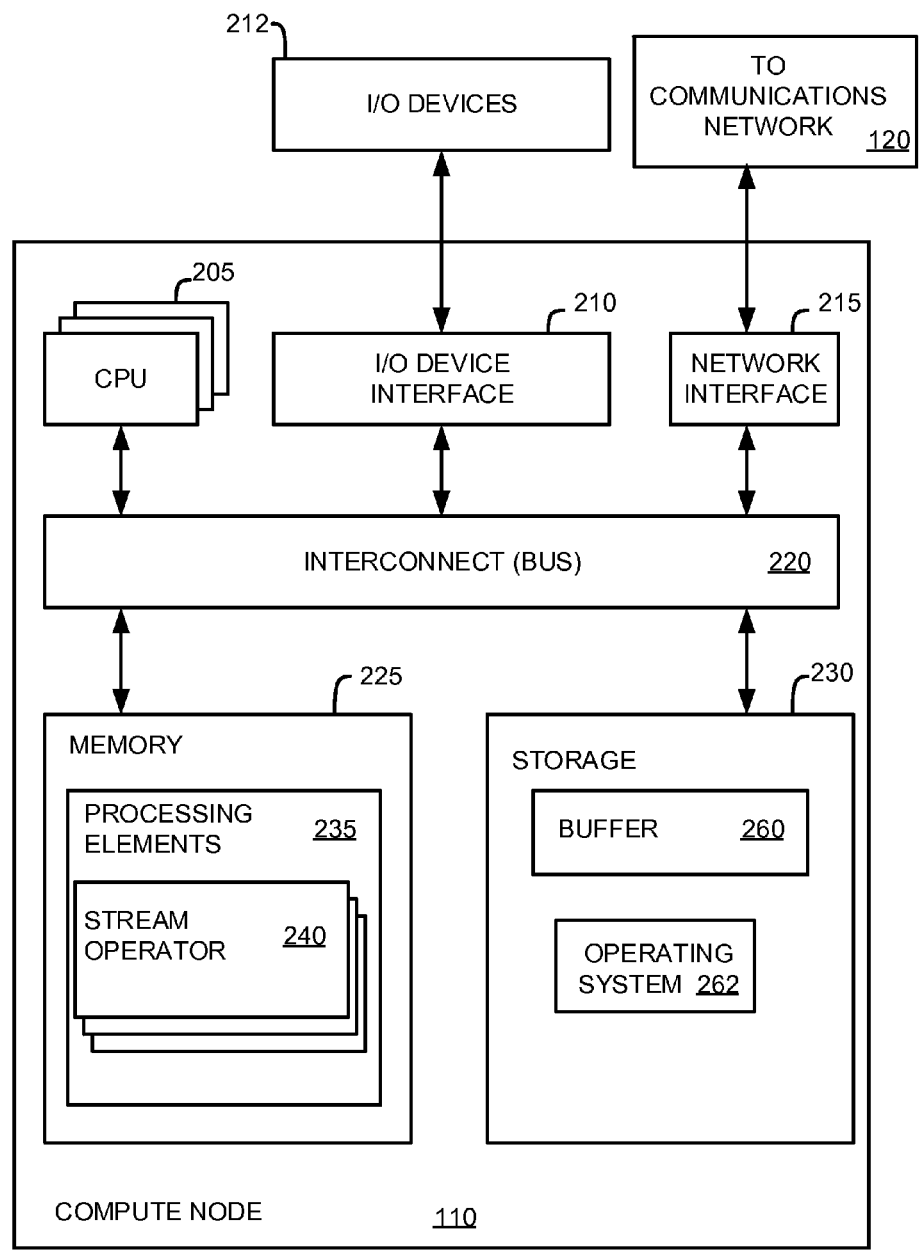
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
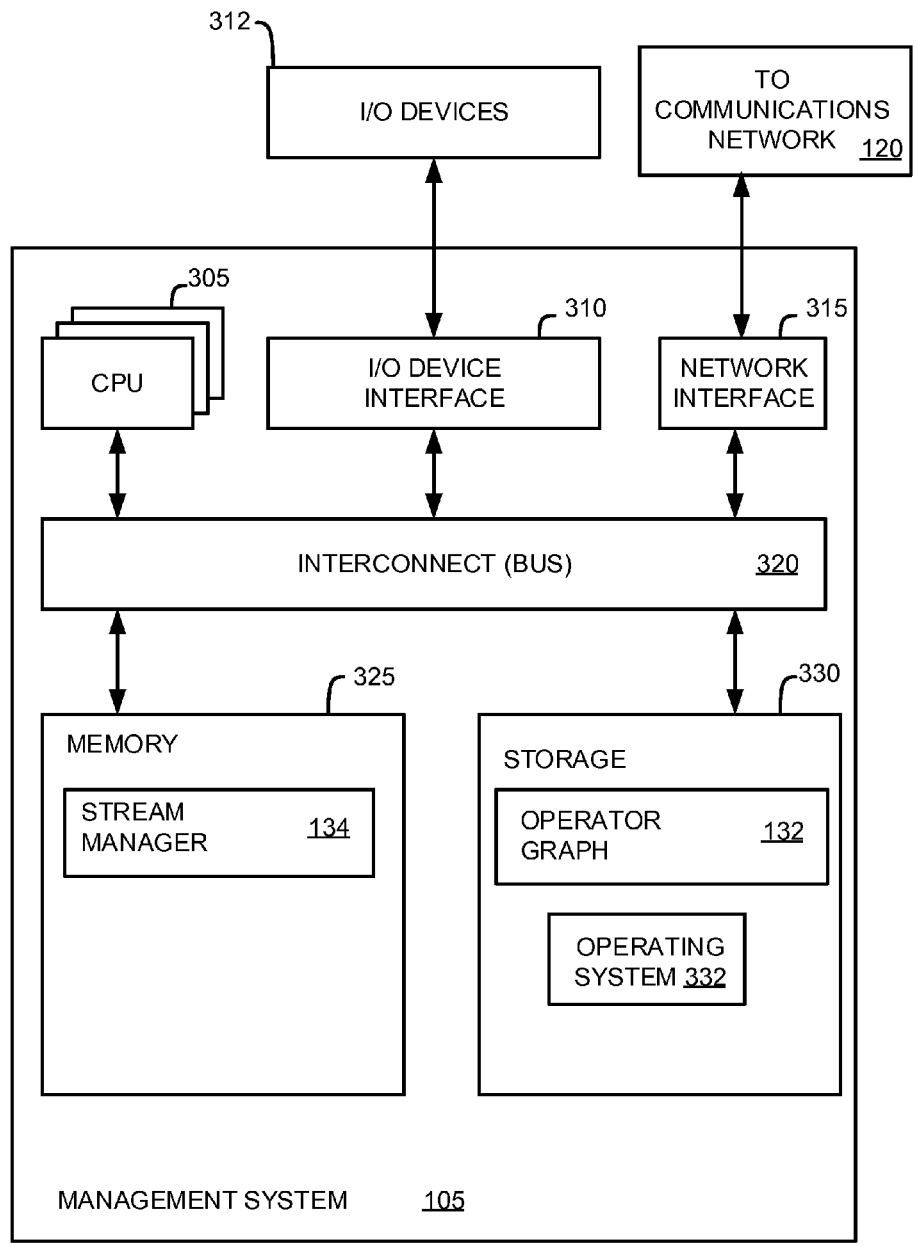
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
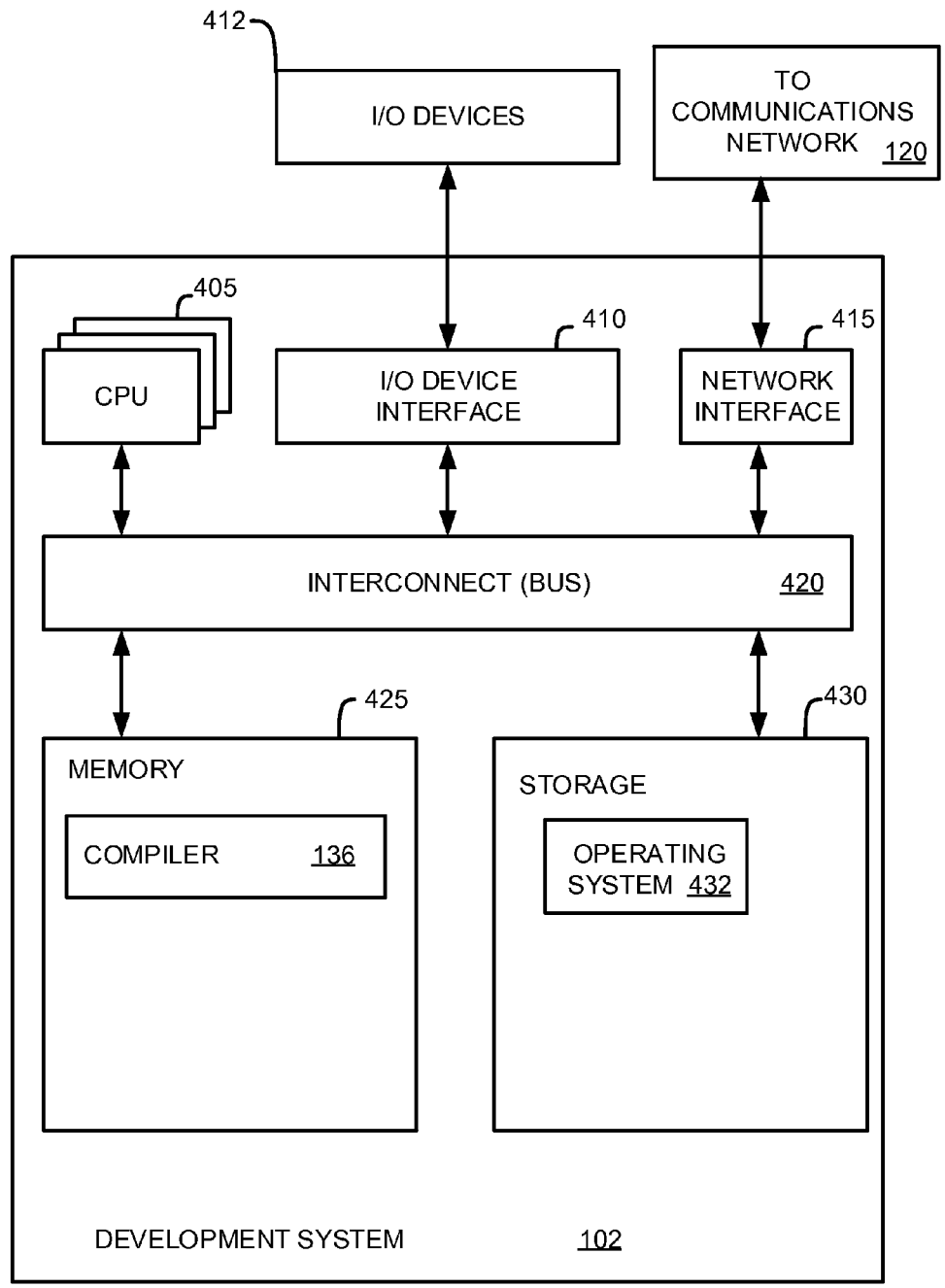
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
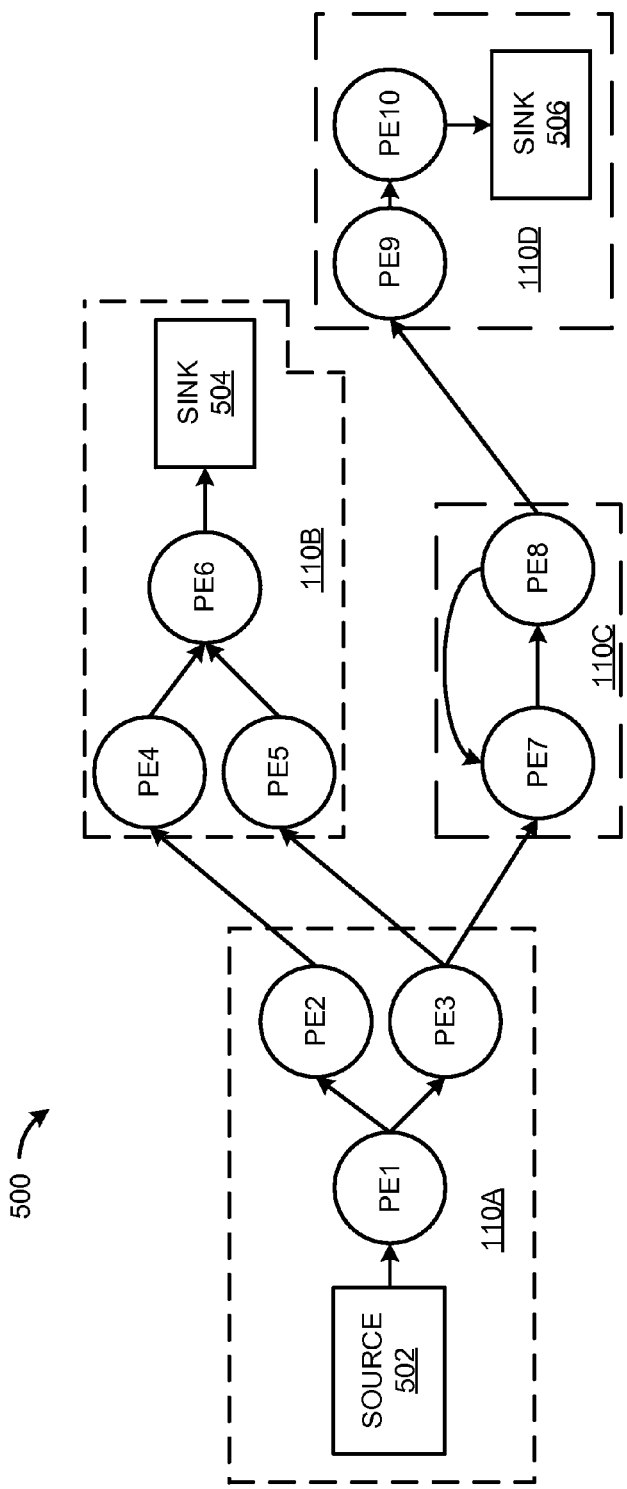
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
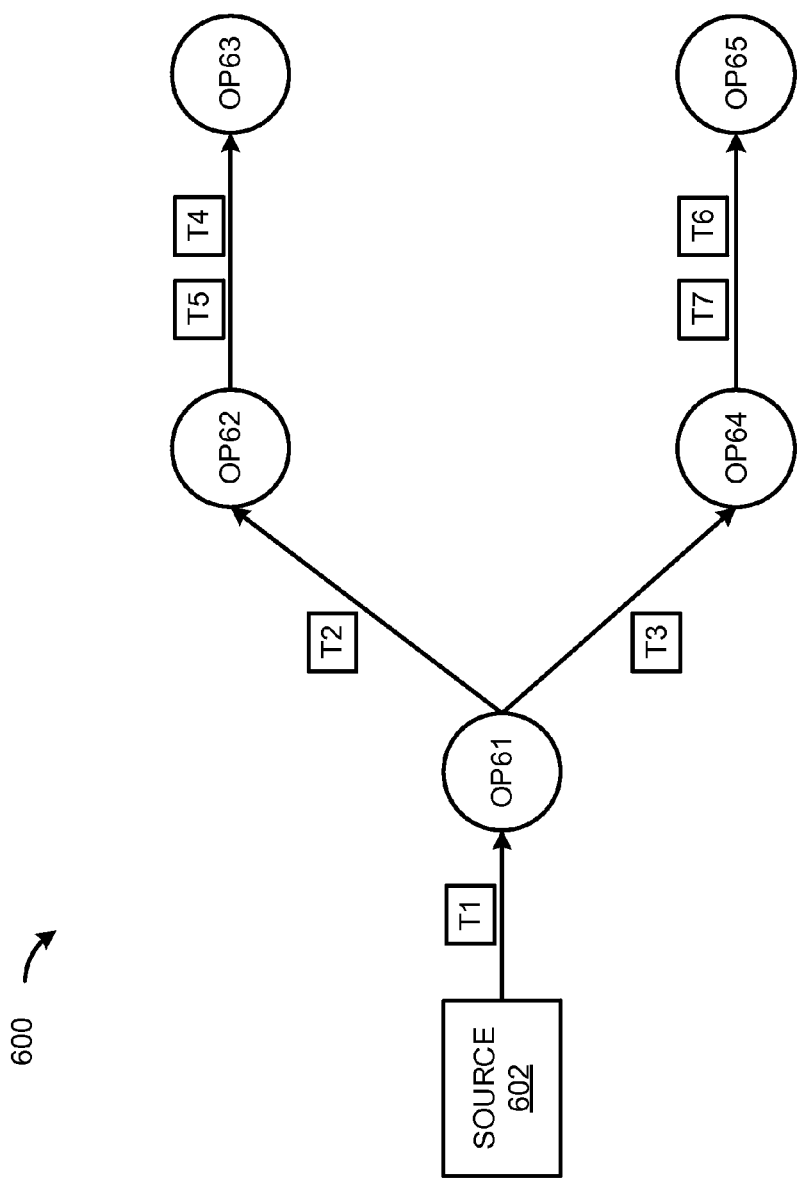
FIG. 6 illustrates an example of an operator graph of a stream computing application in which illustrative embodiments of the present disclosure may be implemented.

Referring now to FIG. 6, shown is an example of an operator graph 600 of a stream computing application in which illustrative embodiments of the present disclosure may be implemented. The operator graph 600 consists of a source 602, five stream operators OP61-OP65, and 7 tuples of data T1-T7. The first tuple T1 is a tuple generated by a source 602 and sent to the first stream operator OP61. The remaining tuples T2-T7 are tuples that are generated by the stream operators as a result of the first tuple T1 entering the operator graph 600.

For example, after the first tuple T1 enters the first stream operator OP61, the first stream operator may perform one or more operations on the first tuple. After the first stream operator OP61 performs the one or more operations on the first tuple, the first stream operator may generate two tuples T2 and T3 based on processing the data from the first tuple T1. The first stream operator OP61 may send the second tuple T2 to the second stream operator OP62 and the third tuple T3 to the fourth stream operator OP64. The second stream operator OP62 may receive the second tuple T2, perform an operation on the second tuple, and generate two additional tuples T4 and T5. The second stream operator OP62 may then transmit the two tuples T4 and T5 to the third stream operator OP63. The fourth stream operator OP64 may receive the third tuple T3, perform an operation on the third tuple, and generate two additional tuples T6 and T7. The fourth stream operator OP64 may then transmit the two tuples T6 and T7 to the fifth stream operator OP65.

The second and third tuples T2 and T3 may be considered first-generation spawns of the first tuple T1 because the second and third tuples were generated by the first stream operator OP61 performing an operation on the first tuple. Likewise, the fourth and fifth tuples T4 and T5 may be considered first-generation spawns of the second tuple T2, and the sixth and seventh tuples T6 and T7 may be considered first-generation spawns of the third tuple T3. The fourth, fifth, sixth, and seventh tuples T4-T7 may also be considered second-generation spawns of the first tuple T1 because the fourth, fifth, sixth, and seventh tuples were generated by stream operators (OP62 and OP63) performing operations on first-generation spawns of the first tuple, namely the second and third tuples T2 and T3.

Each tuple in the operator graph 600 may have a tuple ID, which is a unique identifier for that tuple. Tuple IDs may be assigned to a tuple when the tuple is generated by a stream operator or when it enters the operator graph. For example, the source 602 may assign a tuple ID to the first tuple T1, and the first stream operator OP61 may assign a tuple ID to the second and third tuples T2 and T3. The tuple IDs may be used by the stream manager, the stream operators, and/or processing elements to monitor the creation of spawn tuples. For example, the tuple spawn counts may store a list of all of the tuple IDs and their associated spawn tuples in an associated array or map. For illustration, the first tuple in the operator graph 600 has the tuple ID of "T1," the second tuple has a tuple ID of "T2," and so on through the seventh tuple with a tuple ID of "T7."

Referring now to FIG. 7, shown is an example table 700 depicting tuple spawn counts for the operator graph 600 of FIG. 6 that may be monitored to limit tuple creation at the tuple level, in accordance with embodiments of the present disclosure. The table 700 is a visual representation of tuple spawn counts and the information that may be monitored in embodiments of the present disclosure, and is used for illustrative purposes. In practice, the tuple spawn counts may be saved in a substantially different form, and the present disclosure should not be limited by the use of the table 700 to represent the tuple spawn counts.

The table 700 represents the tuple spawn counts that may be collected from the operator graph 600 with a tuple assignment policy that charges first-generation and second-generation spawn tuples to their progenitor tuple, but only if the progenitor tuple was generated in the source 602. This may be tracked if, e.g., a stream administrator wants to limit the total amount of work generated by a tuple entering the operator graph, but is not concerned with where the work is generated or performed within the operator graph.

The table 700 may consist of four columns 702A-D and six rows 704A-F. Each row may correspond to an associated spawn tuple, and each column may store the specific information tracked about the spawn tuples. The table 700 may store a progenitor tuple's tuple ID in the first column 702A, the number of associated spawn tuples for the progenitor tuple in the second column 702B, the tuple IDs for the associated spawn tuples in the third column 702C, and the operator that generated the associated spawn tuples in the fourth column 702D.

The table 700 illustrates that, for the operator graph 600 (shown in FIG. 6) with a tuple assignment policy as described earlier in reference to FIG. 7, the first tuple T1 has six associated spawn tuples. The associated spawn tuples are tuples T2, T3, T4, T5, T6, and T7. Tuples T2 and T3 were generated by the first stream operator OP61; tuples T4 and T5 were generated by the second stream operator OP62; and, tuples T6 and T7 were generated by the fourth stream operator OP64.

Referring now to FIG. 8, shown is an example table 800 depicting tuple spawn counts for the operator graph 600 of FIG. 6 that may be monitored to limit tuple creation at the tuple level, in accordance with embodiments of the present disclosure. The table 800 is a visual representation of tuple spawn counts and the information that may be monitored in embodiments of the present disclosure, and is used for illustrative purposes. In practice, the tuple spawn counts may be saved in a substantially different form, and the present disclosure should not be limited by the use of the table 800 to represent the tuple spawn counts.

The table 800 represents the tuple spawn counts that may be collected from the operator graph 600 with a tuple assignment policy that charges only first-generation spawn tuples to their progenitor tuple. This tuple assignment policy may exist if, e.g., a stream administrator is primarily concerned with ensuring that individual stream operators are not overloaded with tuple creation work, or to ensure that downstream operators do not receive a barrage of tuples that could overload their memory spaces or cause backpressure in the stream computing application.

The table 800 may consist of four columns 802A-D and six rows 804A-F. Each row may correspond to an associated spawn tuple, and each column may store the specific information tracked about the spawn tuples. The table 800 may store a progenitor tuple's tuple ID in the first column 802A, the number of associated spawn tuples for the progenitor tuple in the second column 802B, the tuple IDs for the associated spawn tuples in the third column 802C, and the operator that generated the associated spawn tuples in the fourth column 802D.

The table 800 illustrates that, for the operator graph 600 (shown in FIG. 6) with a tuple assignment policy as described earlier in reference to FIG. 8, each of the first, second, and third tuples T1-T3 has two associated spawn tuples. The first tuple T1 has associated spawn tuples T2 and T3, both of which were generated by the first stream operator OP61. The second tuple T2, in addition to being a spawn tuple of the first tuple T1, is a progenitor tuple for tuples T4 and T5, both of which were generated by the second stream operator OP62. The third tuple T3, in addition to being a spawn tuple of the first tuple T1, is a progenitor tuple for tuples T6 and T7, both of which were generated by the fourth stream operator OP64. Unlike the table 700 discussed in reference to FIG. 7, in this case the fourth, fifth, sixth, and seventh tuples T4-T7 are no longer associated spawn tuples of the first tuple T1. This is because the tuple assignment policy used by the operator graph in FIG. 8 only charges first-generation spawn tuples to a progenitor tuple, and the fourth, fifth, sixth, and seventh tuples T4-T7 are second-generation spawn tuples of the first tuple T1.

Referring now to FIG. 9, shown is another example table 900 depicting tuple spawn counts for the operator graph 600 of FIG. 6 that may be monitored to limit tuple creation at the tuple level, in accordance with embodiments of the present disclosure. The table 900 is a visual representation of tuple spawn counts and the information that may be monitored in embodiments of the present disclosure, and is used for illustrative purposes. In practice, the tuple spawn counts may be saved in a substantially different form, and the present disclosure should not be limited by the use of the table 900 to represent the tuple spawn counts.

The table 900 represents the tuple spawn counts that may be collected from the operator graph 600 with a tuple assignment policy that charges first-generation and second-generation spawn tuples to their progenitor tuple. This tuple assignment policy may exist if, e.g., a stream administrator wants to limit the total amount of work created by a tuple entering the operator graph, and also wants to ensure that downstream operators do not receive a barrage of tuples that could overload their memory spaces or cause backpressure in the stream computing application.

The table 900 may consist of four columns 902A-D and ten rows 904A-J. Each row may correspond to an associated spawn tuple, and each column may store the specific information tracked about the spawn tuples. The table 900 may store a progenitor tuple's tuple ID in the first column 902A, the number of associated spawn tuples for the progenitor tuple in the second column 902B, the tuple IDs for the associated spawn tuples in the third column 902C, and the operator that generated the associated spawn tuples in the fourth column 902D.

The table 900 illustrates that, for the operator graph 600 (shown in FIG. 6) with a tuple assignment policy as described earlier in reference to FIG. 9, each of the first, second, and third tuples T1-T3 has associated spawn tuples. The first tuple T1 has six associated spawn tuples T2-T7. The first tuple's first-generation spawn tuples T2 and T3 were generated by the first stream operator OP61; the first tuple's second-generation spawn tuples T4 and T5 were generated by the second stream operator OP62; and, the first tuple's second-generation spawn tuples T6 and T7 were generated by the fourth stream operator OP64. The second tuple T2, in addition to being a spawn tuple of the first tuple T1, is also a progenitor tuple for tuples T4 and T5, both of which were generated by the second stream operator OP62. The third tuple T3, in addition to being a spawn tuple of the first tuple T1, is a progenitor tuple for tuples T6 and T7, both of which were generated by the fourth stream operator OP64.

As is illustrated by the table 900, in some embodiments, a spawn tuple may be charged to more than one of its progenitor tuples. For example, the fourth tuple T4 is an associated spawn tuple of both the first tuple T1 (see row 904C) and the second tuple T2 (see row 904G). Likewise, the table 900 illustrates that, in some embodiments, a tuple may be both an associated spawn tuple of a progenitor tuple, and it may have its own associated spawn tuples. For example, the second tuple T2 is an associated spawn tuple of the first tuple T1 (see row 904A), and the second tuple also has its own associated spawn tuples T4 and T5 (see rows 904G and 904H).

Figure 10:
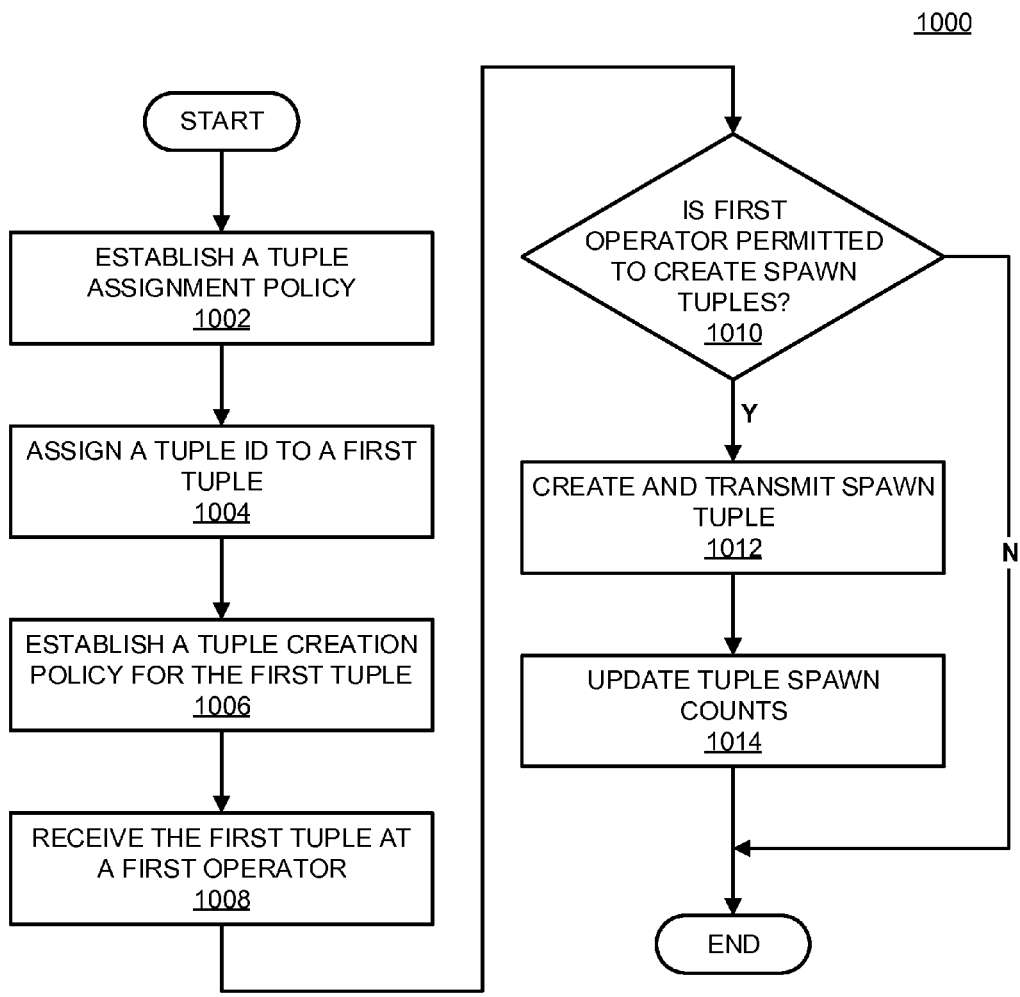
FIG. 10 is a flowchart illustrating a method for limiting tuple creation at the tuple level, in accordance with embodiments of the present disclosure.

Referring now to FIG. 10, shown is a flowchart illustrating a method 1000 for limiting tuple creation at the tuple level, in accordance with embodiments of the present disclosure. In some embodiments, the method 1000 may be performed by a stream manager 134 (shown in FIG. 1). In some embodiments, the method 1000 may be performed by a stream operator. The method 1000 may begin at operation 1002, where a tuple assignment policy is established.

In some embodiments, the tuple assignment policy established in operation 1002 may apply to all stream operators and processing elements in the entire operator graph. In other embodiments, the tuple assignment policy established in operation 1002 may only apply to a group of stream operators or processing elements. Other groups of stream operators and processing elements in the same operator graph may have a different tuple assignment policy. Some of the stream operators or processing element in the operator graph may not have a tuple assignment policy. In some embodiments, the tuple assignment policy established in operation 1002 may only apply to a single stream operator or processing element. In these cases, other stream operators and processing elements may have their own tuple assignment policy, or they may not have a tuple assignment policy. In embodiments, a tuple generated in a stream operator without a tuple assignment policy will not be charged to its progenitor tuple(s).

In embodiments, the tuple assignment policy may establish what tuples may be charged with the creation of their spawn tuples. For example, the tuple assignment policy may only allow progenitor tuples generated in a source operator to be charged with the creation of spawn tuples. As an additional example, the tuple assignment policy may only allow progenitor tuples generated within a section of the operator graph, such as tuples generated by a group of specific stream operators, to be charged with the creation of their spawn tuples.

In some embodiments, the tuple assignment policy may also establish rules for when a progenitor tuple is to be charged with the creation of its spawn tuples. For example, the tuple assignment policy may charge only first-generation spawn tuples to their progenitor tuple(s). In some examples, the tuple assignment policy may charge all spawn tuples, no matter which generation they are, to their progenitor tuple(s).

There may be scenarios where it is ambiguous as to which tuple caused the creation of a spawn tuple. For example, a multi-ported operator may receive three tuples, one from each of three different data streams, sum the tuples, and transmit a spawn tuple. In these cases, the tuple assignment policy may be configured by a user or administrator to charge the spawn tuple to all, some, or one of the input tuples. For example, in some embodiments the administrator may establish that the spawn tuple should be charged to whichever tuple entered a specific port. In some embodiments, the administrator may charge the spawn tuple to the last tuple coming into the operator, regardless of which port the last tuple used. The administrator may also decide that the spawn tuple should be charged to a randomly chosen tuple, or that the tuple should be chosen by rotating which port is charged with the spawn tuple.

In some embodiments, the tuple assignment policy may outline a window for when to reset the tuple spawn counts. The tuple spawn counts for all tuples may use the same window, or individual tuple spawn counts may have their own windows. The windows may be sliding or tumbling windows. For example, the tuple assignment policy may establish a 5 minute tumbling window for all tuples in an operator graph. After the window has been active for 5 minutes, the tuple spawn counts may be reset and a new window may be generated. As an additional example, the tuple assignment policy may establish a 5 minute tumbling window for tuples generated by a source operator, while tuple spawn counts for other tuples may be reset according to a 10 minute tumbling window.

In some embodiments, the tuple assignment policy may use resetting triggers, in addition to the triggers associated with windows, for determining whether to reset tuple spawn counts. For example, the tuple assignment policy may establish that the tuple spawn counts for a progenitor tuple should be reset when the progenitor tuple, or one of its associated spawn tuples, reenters a stream operator. This may be advantageous for stream computing applications that employ some level of recursive computing, where a tuple is processed by a plurality of stream operators and the output is then fed back in to the operator graph. In some embodiments, the tuple assignment policy may include both timed windows and resetting triggers, such as a tuple reentering a stream operator. In some embodiments, a user or administrator may manually reset the spawn tuple counts.

After establishing a tuple assignment policy per operation 1002, a first tuple may enter the operator graph and be assigned a tuple ID at operation 1004. At operation 1006, a "tuple creation policy" may be established for the first tuple. The tuple creation policy may, through the use of one or more "tuple creation parameters," establish the number of associated spawn tuples that may be generated by the stream operators within the operator graph. The tuple creation policy may also outline where the associated spawn tuples can be generated in the operator graph. In other words, the tuple creation policy establishes the maximum number of associated spawn tuples that can be generated by stream operators. The tuple creation parameters are individual thresholds that set the maximum number of associated spawn tuples that can be generated in specific stream operators. There are many different types of tuple creation parameters than may be established by a stream administrator.

For example, a tuple creation parameter may set out how many associated spawn tuples may be generated anywhere in the operator graph. Another tuple creation parameter may set the maximum number of associated spawn tuples that can be generated by any one stream operator or processing element. Yet another tuple creation parameter may set the maximum number of associated spawn tuples that can be generated in a specific stream operator or processing element. Additional tuple creation parameters may set limits for groups of stream operators or processing elements.

A tuple creation policy may have any combination and number of tuple creation parameters. For example, the stream computing application discussed in reference to FIG. 6 may establish a tuple creation policy for the first tuple T1. The tuple creation policy may outline that no more than 10 associated spawn tuples may be generated anywhere in the operator graph 600, that no individual stream operator may generate more than 5 associated spawn tuples, and that the second stream operator OP62 may not generate more than 2 associated spawn tuples.

In some embodiments, every tuple that enters, or is generated in, an operator graph may have the same tuple creation policy. In other embodiments, individual tuples may have different tuple creation policies and parameters. The tuple creation policy may be set by a stream manager or by a user or administrator. The stream manager may consider historical information, such as how many tuples are usually generated at each stream operator and in the graph as a whole. The stream manager may also consider historical performance metrics, such as CPU utilization and memory usage, when establishing the tuple creation policy.

In some embodiments, the stream manager may determine the tuple creation policy for a tuple by examining the tuple's attributes. For example, if the tuple's attributes indicate that it is a high priority tuple, the tuple creation policy may allow the tuple to generate more spawns than normal. If, however, the tuple's attributes indicate that it is a low priority tuple, the tuple creation policy may limit the creation of spawn tuples to a smaller number than usual. There are numerous attribute values and types that may be used by a stream manager or stream operator to determine a tuple creation policy for a tuple.

For example, the stream manager may, in some embodiments, have several predetermined tuple creation policies that it can pick from. There may be a first tuple creation policy for high priority jobs, a second tuple creation policy for standard priority jobs, and a third tuple creation policy for low priority jobs. The first tuple creation policy may allow for the creation of more spawn tuples than the second tuple creation policy, and the second tuple creation policy may allow for more spawn tuples than the third tuple creation policy. A tuple may have a serial number as one of its attributes, the serial number identifying the job that the tuple supports. The stream manager may then determine, based on the serial number, that the tuple supports a high priority job. The stream manager may, in response to determining that the tuple supports a high priority job, establish the first tuple creation policy that allows for the creation of the greatest number of spawn tuples.

As another example, the attribute may include a description of the type of information carried by the tuple. For example, an attribute of a first tuple may indicate that the first tuple is carrying image data, while an attribute value of a second tuple may indicate that the second tuple is carrying metadata. The stream manager or a stream operator may prioritize image data over metadata and, therefore, establish a tuple creation policy for the first tuple that allows for the creation of more associated spawn tuples than the tuple creation policy for the second tuple. The examples of how a tuple's attributes may be used to establish a tuple creation policy for the tuple are given for illustrative purposes only, and should not limit the disclosure. One of ordinary skill in the art will recognize different ways in which a tuple's attribute may be examined to establish a tuple creation policy for the tuple.

After establishing a tuple creation policy for the first tuple, at operation 1008 a first stream operator may receive the first tuple at an input port. The first stream operator may be configured to perform a set of operations on the first tuple and output a second tuple based on the first tuple. If, according to the operator's tuple assignment policy, the second tuple is not an associated spawn tuple of the first tuple, the first stream operator may perform the set of operations on the first tuple and transmit the second tuple. If the second tuple is an associated spawn tuple of the first tuple, the first stream operator may, at decision block 1010, determine whether it is permitted to generate an associated spawn tuple from the first tuple.

To determine whether the first stream operator is permitted to generate an associated spawn tuple from the first tuple, the first stream operator may compare the first tuple's tuple spawn counts to its tuple creation policy. If the creation of an associated spawn tuple would cause one of the first tuple's tuple spawn counts to exceed its associated tuple creation parameter, the first stream operator may determine that it is not permitted to generate an associated spawn tuple and the method may end. For example, the first stream operator may determine from the tuple spawn counts that it has generated 2 associated spawn tuples from the first tuple, and it may determine from the tuple assignment policy that it is only allowed to generate 2 associated spawn tuples for any progenitor tuple. Therefore, the first stream operator may conclude that it is not permitted to generate the spawn tuple. The first stream operator may then drop the first tuple out of its memory without creating the spawn tuple. After removing the first tuple from memory, the method may end.

If, however, the creation of an associated spawn tuple would not cause one of the tuple spawn counts to exceed its associated tuple creation parameter, the first stream operator may determine that it can generate an associated spawn tuple. For example, the first stream operator may determine from checking the tuple spawn counts that it has only generated 1 associated spawn tuple for the first tuple. If the first stream operator is permitted by the tuple creation policy to generate 2 associated spawn tuples, the first stream operator may determine that it can generate the spawn tuple.

A situation may arise when a first stream operator, in processing a progenitor tuple, is going to generate multiple associated spawn tuples (e.g., 5 associated spawn tuples), but is only permitted to generate a smaller number of associated spawn tuples (e.g., 4 associated spawn tuples). In some embodiments, the first stream operator may be configured to not generate any associated spawn tuples in this situation. In other embodiments, the first stream operator may generate as many associated spawn tuples as the tuple creation policy allows. The first stream operator may be configured to randomly pick which tuples to generate and transmit. Alternatively, a stream administrator may configure the first stream operator to generate and transmit tuples based on any criteria he wants, such as, e.g., the tuple's importance. For example, if the first stream operator is configured to generate 4 tuples of data and 1 tuple of metadata, and is only allowed to generate 4 tuples, the first stream operator may be configured to drop the tuple of metadata first, only generating the 4 data tuples.

In response to the first stream operator determining that it can generate one or more associated spawn tuples, and after it determines how many it may generate, the first stream operator may generate and transmit one or more associated spawn tuples at operation 1012. The first stream operator may then update the tuple spawn counts, in accordance with its tuple assignment policy at operation 1014 and the method 1000 may end.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer implemented method for processing a stream of tuples comprising:
   receiving a stream of tuples to be processed by a plurality of processing elements operating on one or more computer processors, each processing element having one or more stream operators, wherein one or more of the stream operators include code configured to output tuples to one or more other stream operators;
   receiving a first tuple at a first stream operator, the first stream operator being configured to perform one or more operations on the first tuple and to output a second tuple;
   determining, using a tuple creation policy for the first tuple, that the first stream operator is permitted to generate the second tuple, wherein the tuple creation policy includes a first tuple creation parameter, the first tuple creation parameter defining a maximum number of associated spawn tuples that the first stream operator is permitted to generate for the first tuple;
generating, by the first stream operator and in response to determining that the first stream operator is permitted to generate the second tuple, the second tuple;
determining, using the tuple creation policy for the first tuple, that the first stream operator is not permitted to generate a third tuple; and
removing, by the first stream operator and in response to determining that the first stream operator is not permitted to generate the third tuple, the first tuple from memory without processing the first tuple to create the third tuple.

2. The method of claim 1, wherein the tuple creation policy includes a second tuple creation parameter, the second tuple creation parameter being a maximum number of associated spawn tuples that the first stream operator and a second stream operator of the stream operators are permitted to generate for the first tuple.

3. The method of claim 1, wherein the tuple creation parameters are configured by a user.

4. The method of claim 1, further comprising establishing the tuple creation policy for the first tuple, the tuple creation policy outlining one or more tuple creation parameters for the first tuple.

5. The method of claim 4, wherein the establishing the tuple creation policy for the first tuple comprises:
determining, based on a first attribute of the first tuple, a set of one or more tuple creation parameters for the first tuple; and
establishing the tuple creation policy for the first tuple, the tuple creation policy comprising the set of one or more tuple creation parameters for the first tuple.

6. The method of claim 4, wherein the establishing the tuple creation policy for the first tuple comprises:
determining a first attribute for the first tuple, the first attribute including a serial number;
determining that the serial number indicates that the first tuple supports a first job;
determining a priority level for the first job; and
setting the tuple creation policy that is associated with the first job's priority level.

7. The method of claim 1, wherein determining that the first stream operator is permitted to generate the second tuple comprises:
determining whether the second tuple is an associated spawn of the first tuple using a tuple assignment policy;
determining tuple spawn counts for the first tuple; and
determining that the first stream operator is permitted to generate the second tuple by comparing the first tuple's tuple spawn counts to the tuple creation policy for the first tuple.

8. The method of claim 7, further comprising:
establishing a set of windowing conditions for the tuple spawn count, the windowing conditions outlining when the tuple spawn counts will be reset; and
resetting the tuple spawn counts according to the windowing conditions.

9. The method of claim 7, further comprising:
determining that the first stream operator received a fourth tuple, the fourth tuple being an associated spawn of the first tuple; and
resetting, in response to the first stream operator receiving the fourth tuple, the tuple spawn counts.

10. The method of claim 7 further comprising:
assigning a first tuple ID to the first tuple;
assigning a second tuple ID to the second tuple; and
updating, in response to generating the second tuple, the first tuple's tuple spawn counts to include the second tuple.

11. The method of claim 7, wherein the tuple spawn counts include a first number, the first number being the number of associated spawn tuples generated by the plurality of stream operators in an operator graph.

12. The method of claim 7, wherein the tuple spawn counts include a first list, the first list containing a tuple ID for each of the first tuple's associated spawn tuples and, for each associated spawn tuple, an identifier that indicates which stream operator generated the associated spawn tuple.

13. The method of claim 7, wherein a group of stream operators use the tuple assignment policy, the group of stream operators including the first stream operator.

14. The method of claim 13, wherein the plurality of processing elements are arranged in an operator graph, the operator graph include a second group of stream operators, the second group of stream operators having a second tuple assignment policy, the second tuple assignment policy including one or more rules that determine whether a spawn tuple is an associated spawn of the first tuple.

15. The method of claim 7, wherein the tuple assignment policy includes one or more rules that determine whether a spawn tuple is an associated spawn of the first tuple, wherein the spawn tuple counts for the first tuple include the number of associated spawn tuples for the first tuple generated by stream operators.

16. The method of claim 8, wherein the set of windowing conditions include a first amount of time, the first amount of time being an amount of time for which tuple spawn counts are maintained before resetting.

17. The method of claim 1, wherein determining that the first stream operator is permitted to generate the second tuple comprises:
determining that the first stream operator is configured to generate a first number of associated spawn tuples when processing the first tuple;
determining, using the tuple creation policy for the first tuple, a maximum number of associated spawn tuples that can be generated for the first tuple;
identifying a tuple spawn count for the first tuple, the tuple spawn count being a number of associated spawn tuples already generated for the first tuple;
determining a number of remaining associated spawn tuples that can be generated for the first tuple by subtracting the tuple spawn count from the maximum number of associated spawn tuples;
comparing the first number of associated spawn tuples to the number of remaining associated spawn tuples that can be generated for the first tuple;
determining, based on the comparing, that the first number of associated spawn tuples exceeds the number of remaining associated spawn tuples that can be generated for the first tuple;
determining that processing the first tuple will generate a first set of tuples and a second set of tuples, the first set of tuples having a first type of data and the second set of tuples having a second type of data, the first set of tuples including the second tuple;
determining that the first set of tuples has a higher importance than the second set of tuples; and
processing the first tuple to generate the second set of tuples, wherein a number of tuples generated by the processing is less than or equal to the number of remaining associated spawn tuples that can be generated for the first tuple.

18. The method of claim 1, wherein the plurality of processing elements are arranged in an operator graph for a stream computing application, and wherein the tuple creation policy for the first tuple is automatically generated by a processor using historical information, the historical information including previous CPU utilization and memory usage of the stream computing application.

* * * * *